(12) United States Patent
Razak et al.

(10) Patent No.: US 10,794,330 B2
(45) Date of Patent: Oct. 6, 2020

(54) GAS TURBINE ENGINE INCLUDING A RE-HEAT COMBUSTOR AND A SHAFT POWER TRANSFER ARRANGEMENT FOR TRANSFERRING POWER BETWEEN LOW AND HIGH PRESSURE SHAFTS

(71) Applicant: ROLLS-ROYCE plc, London (GB)

(72) Inventors: Ahmed M Y Razak, Bristol (GB); Paul Fletcher, Rugby (GB)

(73) Assignee: ROLLS-ROYCE PLC, London (GB)

( * ) Notice: Subject to any disclaimer, the term of this patent is extended or adjusted under 35 U.S.C. 154(b) by 357 days.

(21) Appl. No.: 15/810,263

(22) Filed: Nov. 13, 2017

(65) Prior Publication Data

US 2018/0149115 A1    May 31, 2018

(30) Foreign Application Priority Data

Nov. 25, 2016  (GB) .................................. 1619960.6

(51) Int. Cl.
*F02C 6/00*    (2006.01)
*F02C 7/36*    (2006.01)
(Continued)

(52) U.S. Cl.
CPC ................ *F02K 3/11* (2013.01); *F02C 3/113* (2013.01); *F02C 3/14* (2013.01); *F02C 6/003* (2013.01);
(Continued)

(58) Field of Classification Search
CPC .... F02C 3/113; F02C 3/14; F02C 7/36; F02C 6/003; F02C 6/08; F02K 3/02;
(Continued)

(56) References Cited

U.S. PATENT DOCUMENTS

| | | | |
|---|---|---|---|
| 3,458,118 A | | 7/1969 | Burge et al. |
| 3,635,029 A | * | 1/1972 | Menioux ................. F02K 3/075 60/224 |

(Continued)

FOREIGN PATENT DOCUMENTS

| | | |
|---|---|---|
| EP | 1 988 303 A2 | 11/2008 |
| EP | 2226487 | 9/2010 |

(Continued)

OTHER PUBLICATIONS

European Search Report dated Apr. 6, 2018 issued in EP Patent Application No. 17199655.

(Continued)

*Primary Examiner* — William H Rodriguez
(74) *Attorney, Agent, or Firm* — Brinks Gilson & Lione

(57) ABSTRACT

A gas turbine engine may include a high pressure compressor coupled to a high pressure turbine by a high pressure shaft, a core combustor located downstream of the high pressure compressor and upstream of the high pressure turbine, and a low pressure compressor provided upstream of the high pressure compressor. The low pressure compressor may be configured to direct core airflow to the high pressure compressor and first bypass airflow which bypasses the high pressure compressor, core combustor and high pressure turbine through a first bypass duct. The engine may further include a mixer downstream of the high pressure turbine and low pressure compressor, the mixer being configured to mix the core and first bypass airflows. The engine also may include a re-heat combustor configured to combust fuel with both core airflow and first bypass airflow. A low pressure turbine may be provided downstream of the re-heat combustor and coupled to the low pressure compressor (14) by a low pressure shaft, the low pressure and high pressure shafts being independently rotatable. A shaft power transfer arrangement may be provided, which is configured to selec- (Continued)

tively transfer power between the low pressure and high pressure shafts.

7 Claims, 3 Drawing Sheets

(51) Int. Cl.
| | |
|---|---|
| F02K 3/11 | (2006.01) |
| F02K 3/08 | (2006.01) |
| F02C 3/14 | (2006.01) |
| F02C 3/113 | (2006.01) |
| F02K 1/06 | (2006.01) |
| F02K 1/38 | (2006.01) |
| F02K 3/077 | (2006.01) |
| F02K 3/10 | (2006.01) |
| F02K 3/06 | (2006.01) |

(52) U.S. Cl.
CPC ............... *F02C 7/36* (2013.01); *F02K 1/06* (2013.01); *F02K 1/38* (2013.01); *F02K 3/077* (2013.01); *F02K 3/08* (2013.01); *F02K 3/10* (2013.01); *F02K 3/06* (2013.01); F05D 2220/323 (2013.01); F05D 2260/40 (2013.01); F05D 2270/101 (2013.01)

(58) Field of Classification Search
CPC . F02K 3/077; F02K 3/025; F02K 3/06; F02K 3/08; F02K 3/10; F02K 3/11; F02K 1/06; F02K 1/12; F23R 2900/03341
See application file for complete search history.

(56) References Cited

U.S. PATENT DOCUMENTS

| | | | | |
|---|---|---|---|---|
| 3,677,012 A | * | 7/1972 | Batscha | F02K 3/065 |
| | | | | 60/262 |
| 4,043,121 A | * | 8/1977 | Thomas | F02K 3/075 |
| | | | | 60/204 |
| 4,054,030 A | | 10/1977 | Pederson | |
| 4,085,583 A | | 4/1978 | Klees | |
| 4,916,894 A | | 4/1990 | Adamson et al. | |
| 5,231,825 A | | 8/1993 | Baughman et al. | |
| 5,694,765 A | * | 12/1997 | Hield | F02C 3/113 |
| | | | | 60/39.163 |
| 5,867,980 A | * | 2/1999 | Bartos | F02K 7/16 |
| | | | | 60/226.1 |
| 6,202,399 B1 | * | 3/2001 | Frutschi | F02C 6/003 |
| | | | | 60/39.17 |
| 9,239,007 B2 | | 1/2016 | Ekanayake et al. | |
| 2009/0320491 A1 | | 12/2009 | Copeland | |
| 2010/0154383 A1 | | 6/2010 | Ress, Jr. | |
| 2012/0117977 A1 | | 5/2012 | Childers et al. | |
| 2015/0135725 A1 | * | 5/2015 | Belous | F01D 17/105 |
| | | | | 60/791 |
| 2016/0341074 A1 | * | 11/2016 | Fang | F02C 7/14 |
| 2016/0363003 A1 | * | 12/2016 | Davidson | F01D 15/10 |
| 2017/0298816 A1 | * | 10/2017 | Razak | F16H 41/24 |
| 2017/0363043 A1 | * | 12/2017 | Razak | F02C 3/04 |

FOREIGN PATENT DOCUMENTS

| | | |
|---|---|---|
| EP | 2 930 330 A1 | 10/2015 |
| EP | 2930330 | 10/2015 |
| GB | 1602699 | 11/1981 |
| GB | 2515947 | 1/2015 |
| GB | 2515947 A | 1/2015 |
| WO | WO 2008/089925 A2 | 7/2008 |

OTHER PUBLICATIONS

Great Britain Search Report dated May 23, 2017, issued in GB Patent Application No. 1619960.6.
S.N.B Murthy, et al., "Developments in High-Speed-Vehicle Propulsion Systems," Progress in Astronautics and Aeronautics, vol. 165, pp. 105-158.
Hasselrot, et al., "An Overview of Propulsion Systems for Flying Vehicles," Swedish Defence Research Agency Technical Report, Jun. 2005.
Szeliga, et al., "Advanced Supersonic Technology Propulsion System Study Final Report," NASA Lewis Research Center, Jul. 1974.

* cited by examiner

GAS TURBINE ENGINE INCLUDING A RE-HEAT COMBUSTOR AND A SHAFT POWER TRANSFER ARRANGEMENT FOR TRANSFERRING POWER BETWEEN LOW AND HIGH PRESSURE SHAFTS

CROSS-REFERENCE TO RELATED APPLICATIONS

This application is based upon and claims the benefit of priority from British Patent Application Number 1619960.6 filed 25 Nov. 2016, the entire contents of which are incorporated by reference.

FIELD OF THE DISCLOSURE

The present disclosure relates to a gas turbine engine and a method of operating a gas turbine engine. Particularly, though not exclusively, the disclosure relates to gas turbine engines for use in aircraft.

BACKGROUND

There is a continual need to decrease the fuel consumption of aircraft gas turbine engines (for example, in terms of Specific Fuel Consumption (SFC)), in order to save operating costs, and to reduce their environmental impact due to carbon emissions and nitrous oxide (NOx).

In particular, high speed aircraft designed for supersonic operations (such as supersonic civil and military aircraft) need to maintain low SFC, while being capable of operation at high speeds. The requirement to operate at high speeds results in engines having low bypass ratios (i.e. in which a relatively large proportion of airflow through the engine passes through the engine core relative to air that passes through the bypass fan). Typically, this ratio is approximately 0.5 in modern fighter aircraft. However, this results in high subsonic SFC. Since both military and civil supersonic designs spend significant time at subsonic speeds, such high SFC results in high operating costs as well as reduced range and loiter time.

Conventional high speed aircraft gas turbine engines frequently employ afterburners to increase thrust for short periods of time. However, afterburners are highly inefficient, and generate large amounts of noise. Consequently, their use may be curtailed in civil aircraft.

Variable cycle engines have been proposed to overcome these problems. One such prior design is known as the "Flex Cycle" Engine proposed by General Electric and described in "Developments In High-Speed Vehicle Propulsion Systems" Volume 165, page 118. In this cycle, a core engine is provided having a first compressor, first combustor and first turbine in series. A bypass engine is provided having a second compressor, second combustor and second turbine provided. The first compressor provides flow to both the engine core and the second combustor in a bypass flow. Downstream, of the first turbine and second combustor, the flows are combined, then flow through the second turbine. The engine can be operated in a first mode, in which only the first combustor is operated, wherein the engine acts as a turbofan having a bypass ratio. In a second mode, the second combustor is operated, such that the engine acts as a turbojet, having no bypass, since all flow flows through compressors, combustors and turbines. However, it has been found that, where the engine is operated in the first mode, large changes in turbine engine, corrected speed and flow function occur, which offset improvements in subsonic performance of the cycle. The high weight of the design may entirely offset any advantages.

Consequently, there is a need to provide a gas turbine engine having high efficiency at a wide range of operational conditions.

The present disclosure describes a gas turbine engine and a method of operating a gas turbine engine which seeks to overcome some or all of the above problems.

BRIEF SUMMARY OF THE DISCLOSURE

According to a first aspect of the present disclosure, a gas turbine engine may include a high pressure compressor coupled to a high pressure turbine by a high pressure shaft, a core combustor located downstream of the high pressure compressor and upstream of the high pressure turbine, and a low pressure compressor provided upstream of the high pressure compressor. The low pressure compressor may be configured to direct core airflow to the high pressure compressor and first bypass airflow which bypasses the high pressure compressor, core combustor and high pressure turbine through a first bypass duct. The gas turbine engine may further include a mixer downstream of the high pressure turbine and low pressure compressor and configured to mix the core and first bypass airflows. The gas turbine engine may also include a re-heat combustor configured to combust fuel with both core airflow and first bypass airflow, and a low pressure turbine located downstream of the re-heat combustor and coupled to the low pressure compressor by a low pressure shaft. The high pressure and low pressure shafts may be independently rotatable. The gas turbine engine may include a shaft power transfer arrangement configured to selectively transfer power between the low pressure and high pressure shafts.

It has been found that the provision of a shaft power transfer arrangement can be used to control the corrected speed of the low pressure shaft, turbine and compressor, and thereby overcome the problems of the prior art.

The low pressure compressor may further comprise a booster compressor configured to compress core air only.

The gas turbine engine may include an afterburner combustor located downstream of the low pressure turbine.

The gas turbine engine may include a core nozzle configured to exhaust core airflow and first bypass airflow. The core nozzle may include a variable area nozzle which may be located downstream of the low pressure turbine, and may be located downstream of the afterburner combustor.

The gas turbine engine may include a fan located upstream of the low pressure compressor, and coupled to a low pressure turbine. The fan may be configured to direct airflow to the low pressure compressor and to a second bypass flow through a second bypass duct. The second bypass duct may include a second bypass nozzle configured to exhaust air separately to the engine core nozzle.

DETAILED DESCRIPTION

Figure 1:
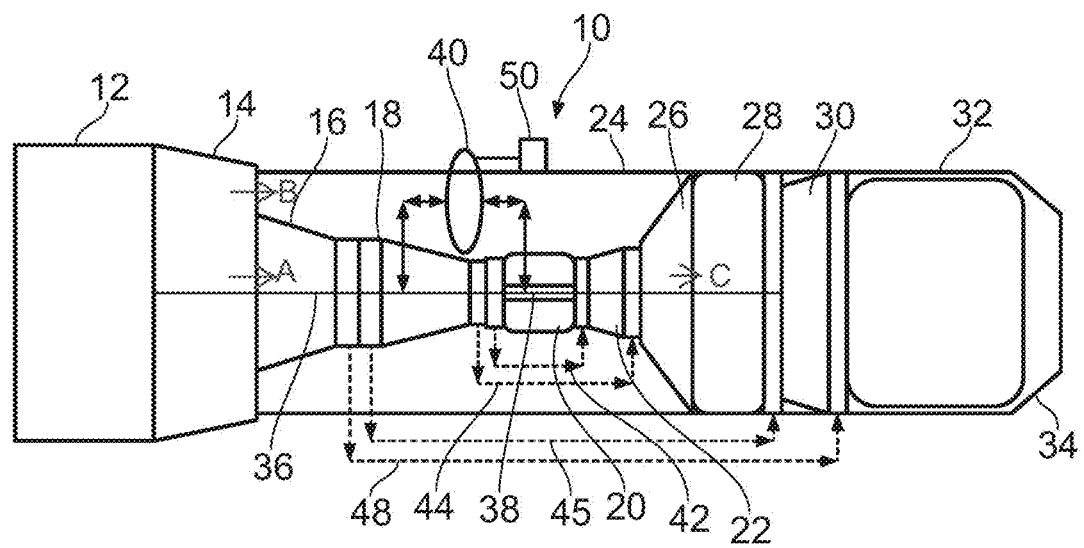
FIG. 1 shows a schematic sectional view of a first gas turbine engine in accordance with the present disclosure.

FIG. 1 shows a first gas turbine engine 10 in accordance with the present disclosure.

The gas turbine engine 10 comprises an air intake 12 and a low pressure compressor comprising a multi-stage fan 14 that generates two airflows A and B. The low pressure compressor further comprises a low pressure booster compressor 16. The gas turbine engine 10 comprises, in axial flow A, a core comprising the booster compressor 16, a high pressure compressor 18, a core combustor 20, and a high pressure turbine 22.

The core combustor 20 is configured to combust fuel with air from the core airflow A only.

The gas turbine engine further comprises, in axial flow B, a bypass duct 24.

Downstream of both the bypass duct 24 and the high pressure turbine 22 is a mixer duct 26. The mixer duct 26 is configured to receive air from both the core and bypass airflows A, B, and combine them to form a mixed airstream C. The gas turbine engine then comprises, downstream of the mixer 26 in axial flow C, re-heat combustor 28, a low pressure turbine 30, an afterburner 32, and a core nozzle in the form of a variable area nozzle 34. The re-heat combustor 28 is configured to combust fuel with air in the mixed airstream C to thereby raise the temperature of the airstream C. The low pressure compressor comprising the multi-stage fan 14 and booster compressor 16, and the low pressure turbine 30 are coupled by a low pressure shaft 36. The high pressure compressor 18 and high pressure turbine 22 are coupled by a high pressure shaft 38. Each of the shafts 36, 38 are independently rotatable, i.e. are capable of rotation at different speeds in operation, with the low pressure shaft 36 generally rotating at a lower rotational speed relative to the high pressure shaft 38.

One or more of the components of the engine 10 may be air-cooled. In this example, the high and low pressure turbines 22, 30 are provided with cooling air via cooling air bleed passages 42, 44 and 45, 48 respectively.

The gas turbine engine 10 further comprises a shaft power transfer arrangement 40. The power transfer arrangement is configured to couple the low and high pressure shafts 36, 38, such that power is selectively transferred between the shafts in use in accordance with a control method described hereinafter. The arrangement 40 could comprise one of several embodiments, shown in FIGS. 4 to 6.

Figure 4:
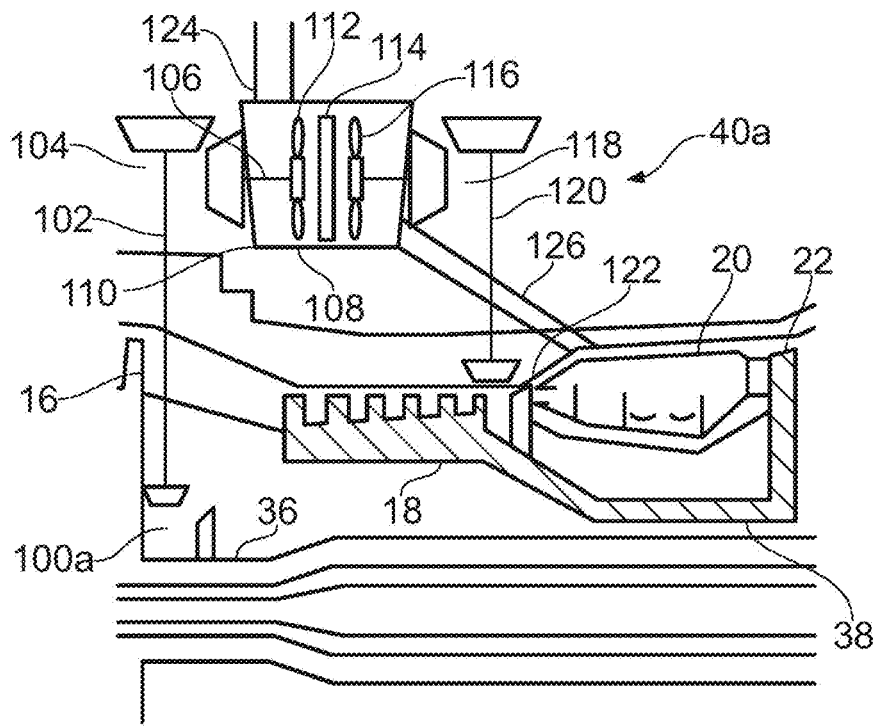
FIG. 4 shows a schematic sectional view of a first power transfer arrangement for use with any of the gas turbine engines of FIGS. 1 to 3.

FIG. 4 shows a first proposed shaft power transfer arrangement 40a. The arrangement 40a comprises a radial drive shaft 102 driven by the low pressure shaft 36 via a first bevel gear arrangement 100. The radial drive 102 is in turn coupled to an input shaft 106 of a torque converter 108 via a second bevel arrangement 104.

The torque converter 108 comprise a fluid filled housing 110a housing an input impeller 112 comprising a bladed rotor configured to impart swirl into the transmission fluid, a bladed stator 114 configured to control swirl of the transmission fluid, and an output turbine 116a, configured to convert swirl of the transmission fluid to torque. The output turbine 116 is coupled to the high pressure shaft 16 a third bevel arrangement 118, output radial drive 120 and fourth bevel arrangement 122.

In this embodiment, the transmission fluid comprises gas turbine engine fuel such as aviation fuel, and is transmitted to the housing 110 via a fuel supply conduit 124. A further fluid supply conduit 126 is provided, which extends between the housing 110 and the first combustor 18. Consequently, a continuous flow of aviation fuel is provided through the housing 110a, which both provides a medium within which the rotors 112, 116 and stator 114 may operate, and cooling to dissipate heat generated by the swirling of the fluid. Since this fluid is then transferred to the combustor 20, the heat produced by the torque converter 108 is conserved within the thermodynamic cycle of the engine 10, and thus any inefficiency in the torque converter 108 is at least partially recovered by the turbines 22, 30. Consequently, the above arrangement provides a highly efficient system. The torque converter 108 could also include a "lock-up" arrangement for mechanically locking the first and second shaft via a clutch, to thereby directly link the low and high pressure shafts 36, 38 at a predetermined gear ratio. One of the radial drives 102, 120 could be coupled to the respective shaft 36, 38 via gearing, which may increase or reduce the speed of the respective radial drive 102, 120 relative to the respective shaft 36, 38.

Figure 5:
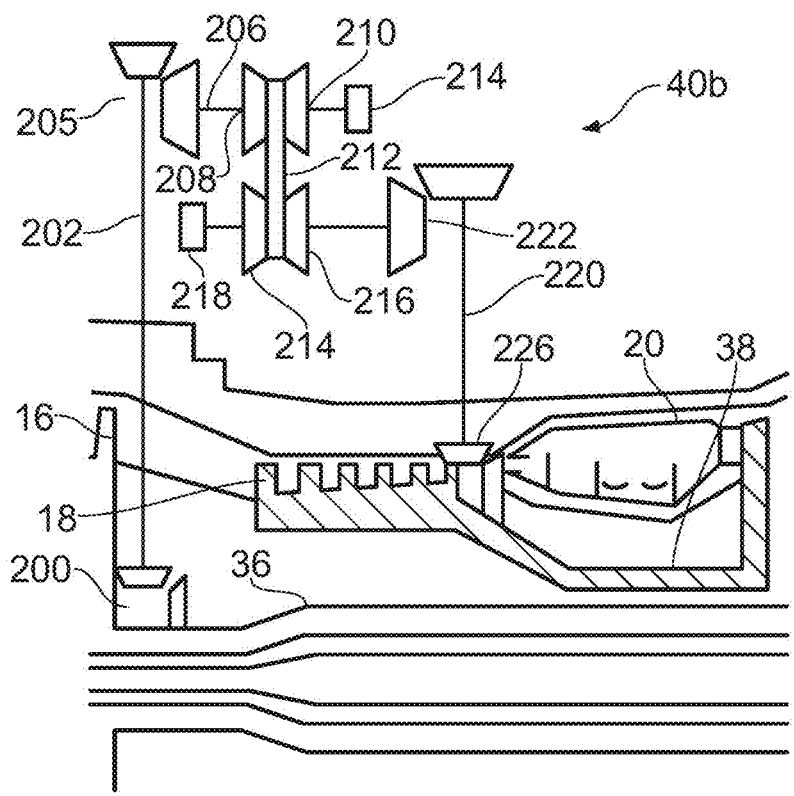
FIG. 5 shows a schematic sectional view of a second power transfer arrangement for use with any of the gas turbine engines of FIGS. 1 to 3.

FIG. 5 shows a first alternative coupling arrangement 40b. The arrangement 40b comprises a radial drive shaft 202 driven by the low pressure shaft 36 via a first bevel gear arrangement 200. The radial drive 202 is in turn coupled to an input shaft 206 of a continuously variable transmission arrangement (CVT) via a second bevel gear arrangement 205.

The CVT comprises first and second conical input rotors 208, 210 which are driven by the input shaft 206 and coupled to one another by a drive chain 212. A first actuator 214 varies the axial distance between the first and second rotors 208, 210 to thereby vary the effective outer diameter of the rotors 208, 210 where they engage with the chain 212, and so the input gearing of the CVT 204. The also chain 212 extends around third and fourth conical output rotors 214, 216, which are thereby rotated by the chain 212. The fourth rotor 216 is coupled to the high pressure shaft 38 via an output shaft 220, a third bevel arrangement 222, a second radial drive shaft 224 and a fourth bevel arrangement 226. The rotors 214, 216 are coupled to a second actuator 218 which again varies the axial distance between the conical rotors 214, 216 to thereby vary the output gearing of the CVT 204. In use, the actuators 214, 218 are operated synchronously, such that the gearing of the CVT 204 can be continuously varied without introducing slack or excessive tension into the chain 212. Torque from the low pressure shaft 36 is thus transferrable to the high pressure shaft 38 via the coupling arrangement 40b, and may be transferable to the low pressure shaft 36 from the high pressure shaft 38.

Figure 6:
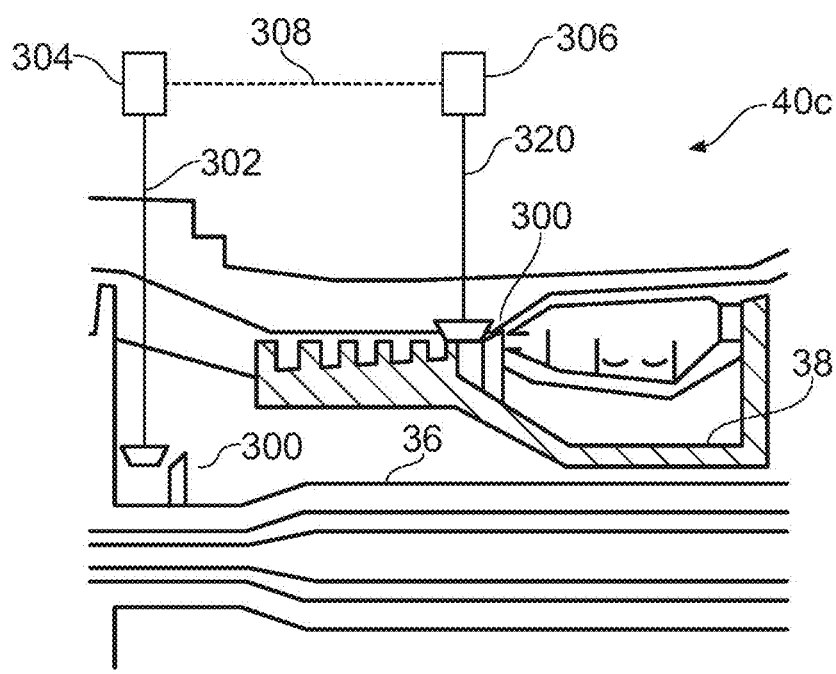
FIG. 6 shows a schematic sectional view of a third power transfer arrangement for use with any of the gas turbine engines of FIGS. 1 to 3.

FIG. 6 shows a second alternative coupling arrangement 40c. The arrangement 40c comprises a radial drive shaft 302 driven by the low pressure shaft 36 via a first bevel gear arrangement 300. An electrical generator 304 is driven by the drive shaft 302, and provides electrical power to a variable speed electric motor 306 via an electrical interconnector 308. The electric motor 306 is coupled to the high pressure shaft 38 via a second bevel gear arrangement 326 and shaft 320. Consequently, power from the low pressure shaft 36 can be transferred to the high pressure shaft 38 via the coupling arrangement 40c.

The gas turbine engine has first and second operating modes. In a first operation mode, the core combustor 20 is operated, whilst the re-heat and afterburner combustors 28, 32 are not operated. This mode is typically employed at subsonic speeds, for reasons that will be explained below.

In the first mode, air flows through both the core airflow A and bypass airflow B. The core airflow A is compressed, heated, expanded and accelerated in turn, and expelled through the propelling nozzle 34 at high velocity. Meanwhile, bypass airflow B is also compressed, expanded and expelled through the propelling nozzle 34. However, bypass airflow B is not heated, since the re-heat combustor 28 is not operated, and so the mixed airstream C has a relatively low temperature at an inlet to the low pressure turbine 430. Consequently, the energy extracted from the low pressure turbine 30 is relatively low. In turn, this means that the work provided by the low pressure compressor 14, 16 is relatively low, and so the bypass velocity and massflow are relatively low. However, since a portion of the flow is bypassed, the engine operates as a bypass turbofan having a low specific thrust, and so is relatively efficient as subsonic speeds.

In the second operating mode, the core is operated as in the first operating mode. However the re-heat combustor 28 is also operated, so that the bypass flow B is heated prior to entering the low pressure turbine 30. Consequently, the engine operates as a turbojet, with all air passing through the combustors 20, 28, so specific thrust is increased, resulting in an engine that operates efficiently at supersonic speeds. In either mode, the afterburner 32 may be operated to provide additional thrust.

It will be understood that, since the low pressure and high pressure turbines 30, 22 are coupled to separate, independently rotatable shafts, and since the re-heat combustor 28 is provided upstream of the low pressure turbine 30 and downstream of the high pressure turbine 22 in core flow A, operation of the re-heat combustor will increase the work provided by the low pressure turbine (in view of the increased upstream pressure thereon) and reduce the work provided by the high pressure turbine 22 (due to the increased back pressure thereon). Consequently, the low pressure compressor 14, 16 speed N1 will tend to increase, while the high pressure compressor 18 speed N2 will tend to decrease. This may result in non-optimal conditions being provided to the compressors 14, 16, 18, and particularly to the high pressure compressor 18. It will be understood that this will tend to reduce the surge margin of the compressor 18. In some circumstances, due to both the increased mass flow and reduced rotational speed, the high pressure compressor 18 may be caused to stall or surge.

In order to address this problem, the engine 10 comprises a shaft power transfer arrangement 40 configured to transfer power between the high and low pressure shafts 36, 38. Consequently, during operation in the second mode, the shaft power transfer arrangement is operated to transfer power from the low pressure shaft 36 to the high pressure shaft 38. Consequently, the rotational speed N1 of the low pressure compressor 14, 16 is reduced, so reducing the core mass-flow rate ṁ(A), and the high pressure compressor speed N2 is increased, so increasing the surge margin of the high pressure compressor 18.

On the other hand, when the engine 10 is operated in the first mode, the opposite is true, i.e. the high pressure compressor speed N2 will tend to increase due to the increased pressure ratio across the high pressure turbine 22, and the low pressure compressor rotational speed will tend to reduce due to the low mass flow and pressure ratio across the low pressure turbine 30. Consequently, the high pressure compressor 18 will tend to over-speed, which may result in damage to the compressor and/or turbine. Consequently, the power transfer arrangement is operated to transfer power from the high pressure shaft 38 to the low pressure shaft 36, thereby reducing the high pressure shaft rotational speed N2, and increasing the low pressure shaft rotational speed N1.

It will be understood that, in some cases, either the high pressure compressor surge margin or the high pressure rotational speed margin may be adequate such that transfer of power is required in one direction only.

In one example, a controller 50 is configured to control the power transfer arrangement 40 such that a high pressure compressor rotational non-dimensional speed $N2/\sqrt{T26}$ (i.e. the ratio of rotational speed of the high pressure shaft 38 to the square root of the high pressure compressor inlet temperature T26) is maintained below a maximum value (by transferring power from the high pressure shaft 38 to the low pressure shaft 36 to prevent high pressure compressor 18 overspeed), and above a minimum value (by transferring power from the low pressure shaft 36 to the high pressure shaft 38 to prevent high pressure compressor 18 stall or surge).

Figure 2:
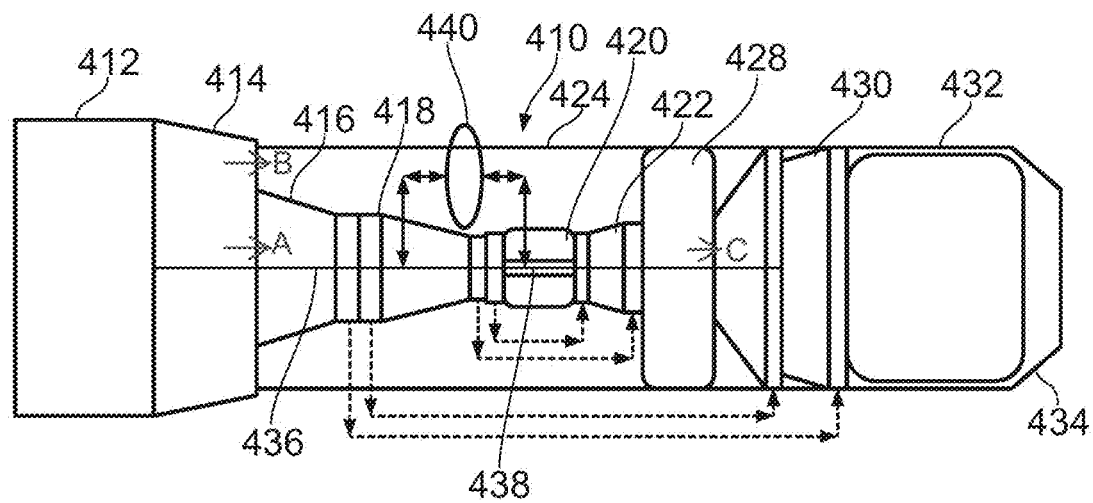
FIG. 2 shows a schematic sectional view of a second gas turbine engine in accordance with the present disclosure.

FIG. 2 shows a second gas turbine engine 410 in accordance with the present disclosure.

The gas turbine engine 410 is similar to the gas turbine engine 10, and comprises an air intake 412 and a low pressure compressor comprising a multi-stage fan 414 that generates two airflows A and B. The low pressure compressor further comprises a low pressure booster compressor 416. The gas turbine engine 410 comprises, in axial flow A, a core comprising the booster compressor 416, a high pressure compressor 418, a first combustor 420, and a high pressure turbine 422. The gas turbine engine further comprises, in axial flow B, a bypass duct 424.

Downstream of both the bypass duct 424 and the high pressure turbine 422 is a re-heat combustor 428 similar to the re-heat combustor 428. The re-heat combustor 428 is configured to receive air from both the core and bypass airflows A, B, and combine them to form a mixed airstream C. Again, the re-heat combustor 428 is configured to combust fuel with air in the mixed airstream C to thereby raise the temperature of the airstream C, but also provides the function of the mixer 26 of the first embodiment shown in FIG. 1.

The gas turbine engine then comprises, downstream of the re-heat combustor 428 in axial flow C, a low pressure turbine 430, an afterburner 432, and a core nozzle in the form of a variable area nozzle 434. The low pressure compressor, comprising the multi-stage fan 414 and booster compressor 416, and the low pressure turbine 430, are coupled by a low pressure shaft 436. The high pressure compressor 18 and high pressure turbine 422 are coupled by a high pressure shaft 438. Each of the shafts 536, 538 are independently rotatable, i.e. are capable of rotation at different speeds in operation, with the low pressure shaft 436 generally rotating at a lower rotational speed relative to the high pressure shaft 438. A power transfer arrangement 440 is provided, which may be configured as described in relation to any of FIGS. 4 to 6. The engine 410 is controlled in a similar manner to the engine 10.

Figure 3:
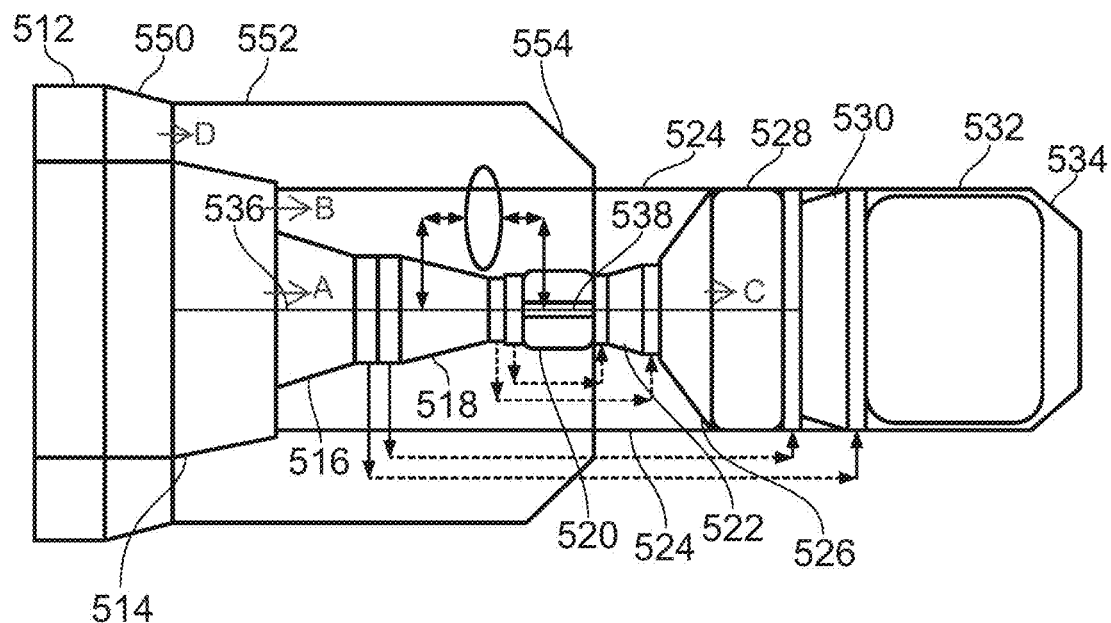
FIG. 3 shows a schematic sectional view of a third gas turbine engine in accordance with the present disclosure.

FIG. 3 shows a third gas turbine engine 510 in accordance with the present disclosure. The engine comprises an inlet 512 and a low pressure compressor comprising a multi-stage fan 514 that generates two airflows A and B. The low pressure compressor further comprises a low pressure booster compressor 516. The gas turbine engine 510 comprises, in axial flow A, a core comprising the booster compressor 516, a high pressure compressor 518, a first combustor 520, and a high pressure turbine 522.

The gas turbine engine further comprises, in axial flow B, a bypass duct 524.

Downstream of both the bypass duct 524 and the high pressure turbine 522 is a mixer duct 526 configured to receive air from both the core and bypass airflows A, B, and combine them to form a mixed airstream C. The gas turbine engine then comprises, downstream of the mixer 526 in axial flow C, re-heat combustor 528, a low pressure turbine 530, an afterburner 532, and a core nozzle in the form of a variable area nozzle 34. The re-heat combustor 528 is configured to combust fuel with air in the mixed airstream C to thereby raise the temperature of the airstream C. The low pressure compressor comprising the multi-stage fan 514 and booster compressor 516, and the low pressure turbine 530, are coupled by a low pressure shaft 536. The high pressure compressor 518 and high pressure turbine 522 are coupled by a high pressure shaft 538. Each of the shafts 536, 538 are independently rotatable, i.e. are capable of rotation at different speeds in operation, with the low pressure shaft 536 generally rotating at a lower rotational speed relative to the high pressure shaft 538.

The gas turbine engine 510 further comprises a fan 550 provided downstream of the inlet 512, and upstream of the low pressure compressor multi-stage fan 514 in both core and bypass flows A, B. The fan 550 is configured to direct air to the low pressure compressor downstream, and to a second bypass flow D within a second bypass duct 552. The second bypass duct extends parallel to the bypass duct 524, and terminates in a fan nozzle 554 at a downstream end, whereby bypass airflow D is exhausted separately to core airflow.

Again, the engine is controlled in a similar manner to the engines 10, 410.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the afterburner 32 could be omitted, particularly where the engine 10 is intended for use in a civilian aircraft.

Different types of fluid couplings could be employed. Different types of continuously variable transmissions could be employed, for example those operating on a magnetic principle. The invention is equally applicable to gas turbine engines having three or more shafts. For example, where the fan is provided, this could be driven by a separate turbine. The invention is also applicable to engines comprising geared fans and/or propellers. The gas turbine engine could be controlled in accordance with a different control scheme.

The engine may further comprise an arrangement for extracting power from one or more shafts independently of the coupling arrangement. For example, the arrangement may comprise an electrical generator coupled to one or more shafts. The generator may comprise a controller configured to control the power output of the generator (and so the torque applied to the shaft to which the generator is coupled) in dependence on engine operating considerations such as compressor operability margin. This controller could control the shafts to assist the coupling arrangement in increasing/reducing the rotational speed of one of the shafts where the second combustor is turned on or off, or throttled.

Except where mutually exclusive, any of the features may be employed separately or in combination with any other features and the disclosure extends to and includes all combinations and sub-combinations of one or more features described herein.

The invention claimed is:

1. A gas turbine engine comprising:
   a high pressure compressor coupled to a high pressure turbine by a high pressure shaft;
   a core combustor located downstream of the high pressure compressor and upstream of the high pressure turbine;
   a low pressure compressor provided upstream of the high pressure compressor, the low pressure compressor being configured to direct core airflow to the high pressure compressor and first bypass airflow which bypasses the high pressure compressor, core combustor and high pressure turbine through a first bypass duct;
   a mixer downstream of the high pressure turbine and low pressure compressor and configured to mix the core and first bypass airflows;
   a re-heat combustor configured to combust fuel with both core airflow and first bypass airflow;
   a low pressure turbine located downstream of the re-heat combustor and coupled to the low pressure compressor by a low pressure shaft, the high pressure and low pressure shafts being independently rotatable;
   a shaft power transfer arrangement configured to selectively transfer mechanical power on a selected one of the low pressure and high pressure shafts to the other of the low pressure and high pressure shafts; and
   a controller configured to cause the power transfer arrangement to transfer mechanical power from the high pressure shaft to the low pressure shaft when the gas turbine engine is in a first operating mode in which the core combustor but not the re-heat combustor operates, and to cause the power transfer arrangement to transfer mechanical power from the low pressure shaft to the high pressure shaft when the gas turbine engine is in a second operating mode in which both the core combustor and the re-heat combustor operate.

2. A gas turbine engine according to claim 1, wherein the low pressure compressor comprises a booster compressor configured to compress core air only.

3. A gas turbine engine according to claim 1, wherein the gas turbine engine comprises an afterburner combustor located downstream of the low pressure turbine.

4. A gas turbine engine according to claim 1, wherein the gas turbine engine comprises a core nozzle configured to exhaust core airflow and first bypass airflow.

5. A gas turbine engine according to claim 4, wherein the core nozzle comprises a variable area nozzle.

6. A gas turbine engine according to claim 1, wherein the gas turbine engine comprises a fan located upstream of the low pressure compressor, and coupled to a low pressure turbine, the fan being configured to direct airflow to the low pressure compressor and to a second bypass flow through a second bypass duct.

7. A gas turbine engine according to claim 6, wherein the second bypass duct comprises a second bypass nozzle configured to exhaust air separately to a core airflow.

* * * * *